United States Patent [19] [11] 4,034,569
Tchernev [45] July 12, 1977

[54] SORPTION SYSTEM FOR LOW-GRADE (SOLAR) HEAT UTILIZATION

[76] Inventor: Dimiter I. Tchernev, 9 Woodman Road, Chestnut Hill, Mass. 02167

[21] Appl. No.: 520,808

[22] Filed: Nov. 4, 1974

[51] Int. Cl.² .......................................... F25B 17/08
[52] U.S. Cl. ...................................... 62/2; 62/112; 252/67
[58] Field of Search ............... 62/2, 480, 476, 526, 62/114, 106, 112; 252/67

[56] References Cited
U.S. PATENT DOCUMENTS 2,293,556   8/1942   Newton ........................... 62/480 X Primary Examiner—William E. Wayner
Attorney, Agent, or Firm—Mason, Mason & Albright

[57] ABSTRACT

A system for the effective utilization of low-grade heat sources such as solar energy, with a system including a molecular sieve material such as zeolite and a gaseous fluid adapted to be absorbed by the material which is in a closed container and circuit which includes a condenser and a gas expansion cooler member. When the container is heated, a gas is given off from the molecular sieve material, cooled in a condenser, and thereafter expaned for cooling purposes. In one embodiment, the cooled gas is received in a further container having absorbent material and subsequently, upon cooling of the first container, the gaseous fluid may be returned thereto via again a condenser and gas expansion cooler member to provide further cooling. In another embodiment, the molecular sieve material is formed by sintering same to form a pressure resistant divider across the container. One side of the divider is heated to create a temperature gradient across the divider so that it functions as a heat energized pump for the gaseous fluid which is adsorbed, a pressure as well as temperature differential developing within the container across the divider whereupon the heated pressurized gas, after giving up some of its energy in a circuit which may include a condenser and gas expansion member, is returned to the container to be again pressurized and heated by the action of the divider composed of the molecular sieve material.

11 Claims, 7 Drawing Figures

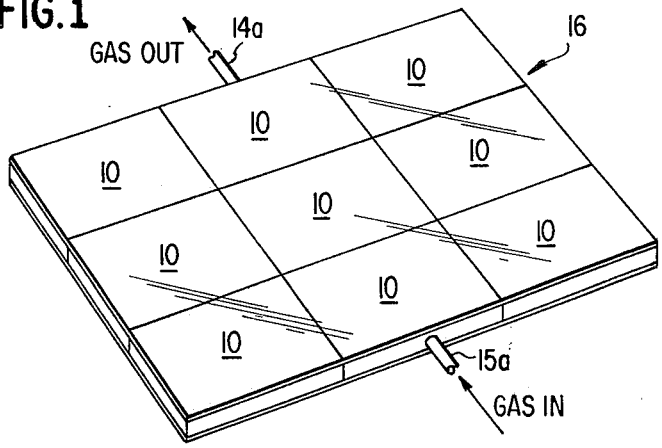
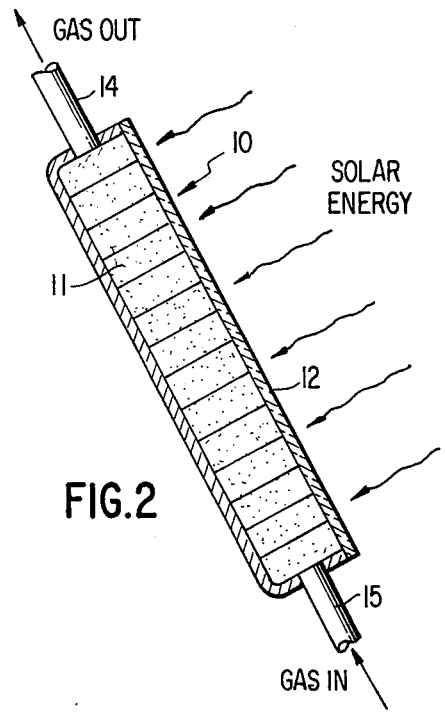
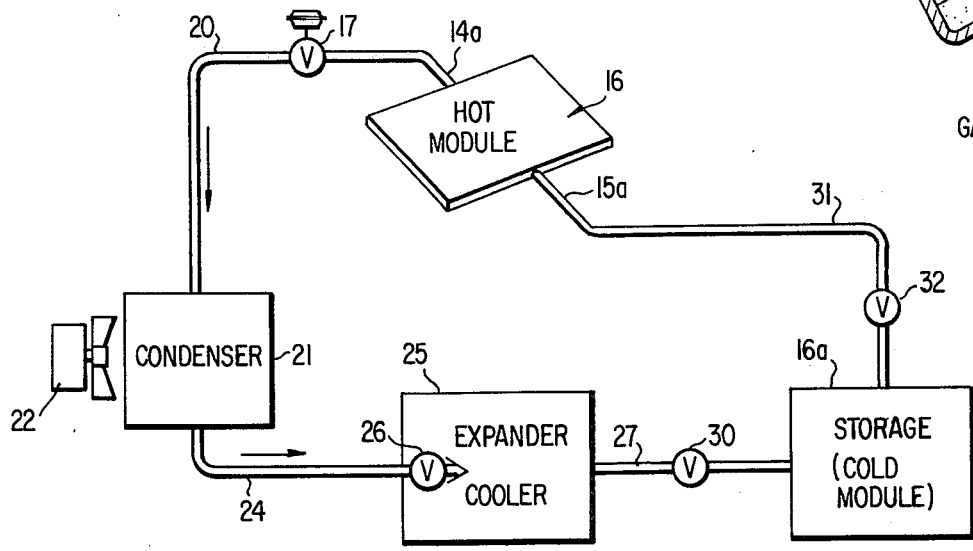
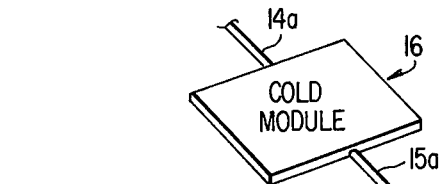
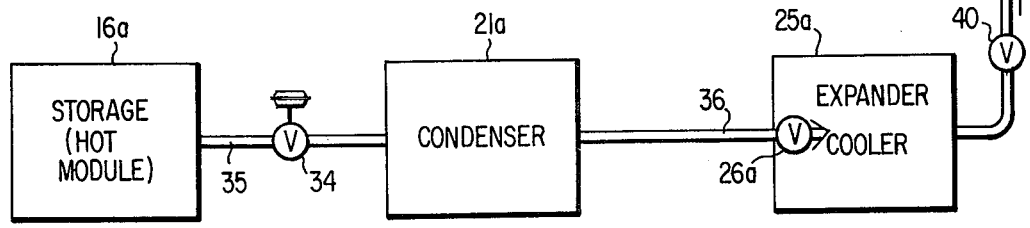

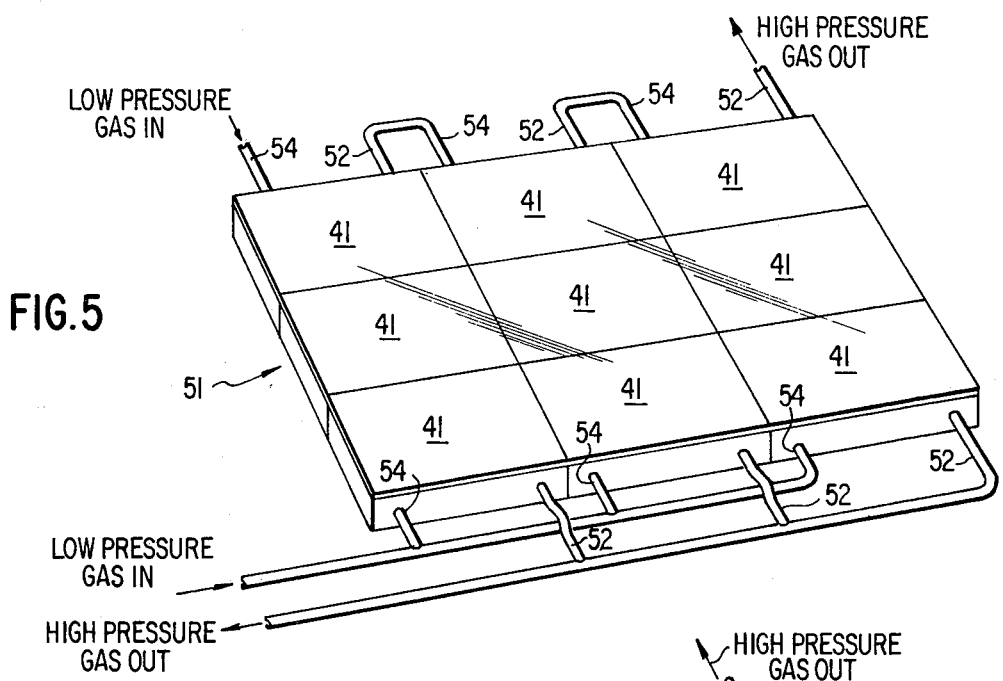
FIG.5
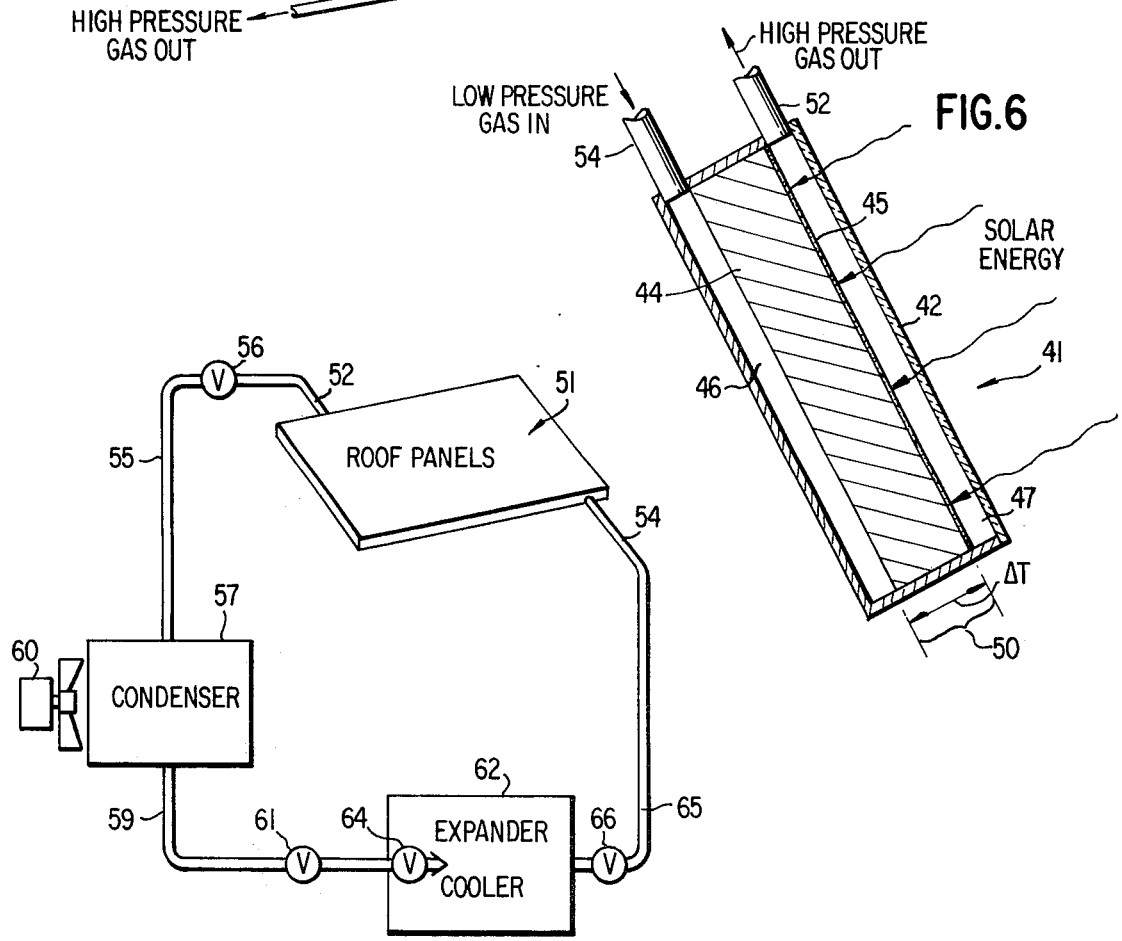
FIG.6
FIG.7

SORPTION SYSTEM FOR LOW-GRADE (SOLAR) HEAT UTILIZATION

BACKGROUND OF THE INVENTION

The present invention relates to a system for the utilization of low-grade heat such as solar energy or the waste heat of a power generating plant by utilizing the large variation of the sorption capacity of molecular sieve zeolite, and other sorption materials, such as activated carbon and silica gel, with variations of temperature. In particular, the system relates to a system which converts small variations in absolute temperature to relatively large variations of gas pressure which is utilized to produce mechanical or electrical energy or cooling in refrigeration.

One of the primary difficulties which hinders the utilization of solar energy for heat and cooling purposes is its low energy density (less than 1.5 kilowatt per square meter) of solar energy on earth. The temperature differentials obtained with solar energy collectors are small and even when solar concentrators are used, temperatures above 200° – 300° centigrade require sophisticated sun-following techniques. Thus, a need exists to develop methods for efficient energy conversion at small temperature differentials, say between 30° – 100° centigrade. Materials exist which will permit the design of such systems, especially to satisfy the needs for home cooling and air-conditioning. The output of such systems increases as the solar load increases and therefore the higher needs for cooling automatically are met by the higher output of such systems. Although the primary objective of this invention is to provide an alternative approach to solar energy cooling and air-conditioning of buildings, the system may also be utilized for the development of large-scale systems capable of operating from waste heat power plants and other thermal poluters thereby reducing the pollution and converting it to useful energy.

Those skilled in the art understand that due to the low temperature differentials obtainable with solar energy, Carnot efficiency of any system using the normal expansion of gases is of necessity quite low. For this reason, most solar energy refrigeration systems have concentrated on the old, well proven absorption refrigeration cycle based on the change of the solubility of a gas in a liquid with temperature. Inasmuch as this process is thermally activated, its dependence on temperature is exponential which permits large changes of gas pressure for small changes in absolute temperature. This process has received new impetus by commercial use of systems other than the ammonia-water used in early gas refrigerators. For example, at Kennedy Airport, New York City, an air conditioning system is provided which utilizes lithium bromide and water as working fluids.

Molecular sieve zeolites comprise a solid material capable of absorbing large quantities of different gases and having even stronger temperature dependence than the presently used exponential one. These materials lend themselves to a unique design which utilizes solid materials and diffusion through them to provide a solar refrigeration system of high conversion efficiency without moving parts and therefore capable of long life and reliability.

The amount of absorbed gas in a molecular sieve is represented by the equation $$a = a_{o_2} \theta_2 + a_{o_n} \theta_n$$

where $a_o$ is the limiting adsorption value of the gas and $\theta_n = \exp[(RT\ln(p_s/p)/E_n]^n$ and $n$ is an integer between 2 and 5. $R$ is the universal gas constant; $p_s$ is the limiting saturation pressure; $p$ is the actual pressure; and $E_n$ is the activation energy, which is on the order of a few kilocalories per mole. In this connection, reference is made to M. Dubin and V. Astakhov, "Description of Adsorption Equilibria of Vapors on Zeolites Over Wide Ranges of Temperature and Pressure," *Second International Conference on Molecular Sieve Zeolites*, Sept. 8–11, 1970, Worcester Polytechnic Institute, Worcester, Mass., pp. 155–166.

In view of the foregoing, it will be understood that the dependence of gas absorption on temperature is at least exponential with a square of temperature and may go as high as to be exponential to the 5th power of the temperature. (For example, acetylene on zeolite NaA).

SUMMARY OF THE INVENTION

The object of the instant invention is to employ solar energy, or other types of energy which have low power densities and therefore produce relatively small heating effects, by the utilization of solid absorption materials to produce reasonably large pressure differentials at small temperature differences. This is accomplished due to the extremely strong temperature dependence (exponential up to the fifth power of the temperature as noted above) of gas sorption and desorption on certain materials such as exist in the molecular sieve zeolite family. The large pressure differential is used in the construction of a solar energy cooling system utilizing such materials. Two different approaches are disclosed, one utilizing constant temperature across the molecular sieve and the other using a temperature gradient which is developed.

Due to the extremely strong temperature dependence, a change in temperature from 25 to 100° centigrade can desorb better than 99.9% of the gas at constant pressure. Alternatively, at a constant volume, the same change in temperature causes an increase of pressure as high as four orders of magnitude. However, although the preferred material is a molecular sieve zeolite, the invention can also use other solid sorbents such as activated carbon or silica gel. In such materials, the sorption capacity for gases is a strong function of temperature and accordingly to this extent they can be utilized in substantially the same fashion as the zeolites.

Two approaches to the use of solar energy are disclosed herein, the first being to construct the roof of a building with panels made of absorbent material and to saturate them at ambient temperatures with the working gas. When the panels are heated by solar heat, they desorb the gas, the pressure increases and the subsequent gas expansion produces the desired cooling effect. The gas is then collected in a separate container which preferably is also provided with a sorbing material and during night time when the roof panels cool by radiation, they may be recharged to saturation again by the working gas and ready for a new cycle during the following day.

The sorption capacity of commercial zeolites is on the order of about 20 to 40 pounds of gas for each 100 pounds of such material. Using existing values of activation energies of between 4 and 10 kilocalories per mole, the theoretical cooling capacities for each 100 pounds of sorbent material are between 10,000 and 20,000 BTU's. Thus, it will be appreciated that the existing roof area of a typical house is sufficient for a reasonably efficient cooling system.

The roof panels may be made by pressing and sintering the molecular sieve materials into the proper shape and sealing them in a container capable of withstanding pressure. Two types of containers are disclosed herein: one with a glass cover in which the solar energy is absorbed directly by the molecular sieve panel which has preferably been darkened on one surface with, for example, carbon black to increase the absorption of solar energy; the other container is constructed completely of a darkened metal and absorbed energy is conducted to the absorbent material on the interior by a structure similar to the familiar honeycomb structure which surrounds the molecular sieve on all sides. Although this latter structure uses indirect heating of the molecular sieve material, it is capable of higher working pressures and, therefore, of higher operating efficiency.

In view of the foregoing, the primary object of this invention is the provision of a system for the utilization of low grade heat such as solar heat or the waste heat of a power generating plant and the like by utilizing a large variation of sorption capacity of molecular sieve zeolites or other sorption materials such as activated carbon and silica gel, whereby with variations in temperature the system converts small variations in absolute temperature to large variations in gas pressure for the subsequent utilization for cooling in refrigeration or other energy uses.

A further object of the invention is to provide the above system to produce a cyclic heating of the sorbent material so that the gas flows from the hot to the cold sorbent under pressure thus generating the desired energy.

A further object is to create a temperature gradient across the sorbent material which produces a pressure differential with the gas flowing from the hot to the cold side of the sorbent material via an external arrangement wherein energy is used and from the cold to the hot side through the material thus creating a continuous gas flow at a pressure differential and, accordingly, continuous use of the energy resulting from the pumping effect across the absorbent material which is relatively heated on one side only.

Further objects, adaptabilities and capabilities will appear as the description progresses, reference being had to the accompanying drawings, in which:

BRIEF DESCRIPTION OF THE DRAWINGS

FIG. 1 is a perspective view illustrating a group of panels in accordance with the invention;

FIG. 2 is a cross-section of one of the panels shown in FIG. 1;

FIG. 3 is a systemic diagram showing the day operation or hot side of the gaseous circuits;

FIG. 4 is a systemic diagrammatic representation of the night operation or cold side of the system;

FIG. 5 shows a group of panels of a further embodiment of the invention;

FIG. 6 is a cross-section of one of the panels shown in FIG. 5; and

FIG. 7 is a systemic diagrammatic representation of a circuit which uses roof panels in accordance with the latter embodiment.

DESCRIPTION OF THE PREFERRED EMBODIMENTS

Referring now to FIGS. 1-4, a container 10 composed of metal or other heat conductive material preferably has a honeycomb structure which is filled with zeolite 11 or other appropriate absorbent material. Surface 12 of container 10 is darkened so that it absorbs as much solar energy as practicable. It will be noted container 10 is provided with a gas outlet 14 and a gas inlet 15. It is to be understood that the cross-sectional view disclosed in FIG. 2 is representative of a number of panels such as indicated in FIG. 1 which can be installed on the roof of a house or any other surface illuminated by the sun. The individual panels 10 are combined into a module 16 into which the gas outlets 14 are connected together in an outlet for the module 14a and in a like manner the gas inlets 15 are connected together to form gas inlet for the module 15a. Each module 16 connects with a oneway valve 17, the valve 17 being pressure controlled to open when the pressure in module 16 builds up to a selected amount. The outlets 14a through an appropriate manifold, lead into a first conduit or line 20 which connects to the intake of a condenser 21 which is cooled by a fan 22. From the outlet of condenser 21, a second conduit or line 24 connects to the inlet of a gas expander cooler member 25 which includes an expansion valve 26. It will be understood by those skilled in the art that the cooler member 25 can be connected to the building's air conditioning to provide cooling therefor. From the cooler member 25 a third line or conduit 27 serves to convey fluid through a one-way valve 30 into a confined space which can be a cold module 16 which is designated 16a in FIG. 3. Alternatively, the can container 16a may be an empty gas container also, if desired, filled with a zeolite material in order to minimize the volume which would otherwise be necessary.

When the modules 16 are heated, the gas in the zeolite material 11 is desorbed and pressure builds up in container 10. When an upper threshold as set by the one-way valve 17 is exceeded, valve 17 opens and gas flows via outlet 14a in the first line 20 to the condenser 21 which may be cooled by the fan 22 as shown or water cooled. The working gas is cooled in condenser 21 where it may be converted into a liquid fluid and then conveyed via the second line 24 to the cooler member 25. Here the gas expands (or the liquid fluid evaporates into a gas) while at the same time cooling the cooler member 25. As indicated above, the cooling effect is preferably used at this point in a conventional way for air-conditioning or refrigeration or the like. The gas then passes through the third line 27 and the one-way valve 30 into the storage space 16a. As previously indicated, storage area 16a *be a module identical to module 16 except that at a particular time it is not exposed to the direct rays of the sun.*

It will be understood that as long as the zeolite in the module 16 is warmer than the gas or zeolite in the storage space 16a the flow of the gas will be from module 16 via condensor 21 and cooler member 25 into the storage area 16a. The next cycle of the operation takes place when the module 16 is no longer being heated such as, for example, being on the shady side of the house, or shaded by some other means, or the sun has set for the night. In such event, module 16 is thereafter cooled by radiation and develops a low pressure in the interior of the container 10. In such event, there are several variations of what may occur. For example, in a desert climate when the days are hot and the nights are cool, the storage space 16a may be buried or otherwise insulated and as indicated in FIG. 3, directly connected to the inlet 15a and the module 16 via a conduit or line 31 containing a one-way valve 32. However, if the evenings are also warm, then air conditioning during the night may be desired in which case the arrangement disclosed in FIG. 4 is more desirable. It will be appreciated that FIG. 4 thus shows the return cycle of the gas from the storage space 16a to the module 16 which is now cooled.

The storage space 16a connects through a fourth line or conduit 35 which contains a one-way pressure regulated valve 34 similar to valve 17 which is set to permit the passage of gas from the storage space 16a at a predetermined pressure differential. Conduit 35 connects into a condenser 21a which may be the same or a different condenser than condenser 21. The outlet from condenser 21a constitutes a fifth line or conduit 36 which leads into the expansion valve 26a of a cooler member 25a which, again, can be the same as cooler member 25 in which case one-way valve 30 should be provided with a second outlet leading back to the module 16 controlled by the relative pressure between the module 16 and the pressure in the storage space 16a, as would occur to one skilled in the art. In this connection it will be noted that a sixth line or conduit 37 connects the outlet of the cooler member 26a and the inlet 15 of the module 16. In line 37 a one-way valve 40 is provided. As indicated, valve 40 and valve 30 can be incorporated in a single valve preferably controlled in the event condenser 21a and coolant member 25a are the same as condenser 21 and coolant member 25, respectively. The condenser 21a may, as condenser 21, be cooled by a fan, cooling water, or other appropriate means.

In the cycle wherein the module 16 is cool and the gaseous fluid therein is at a less pressure than that in the storage space 16a, an appropriate pressure differential builds up, valve 34 opens and the gaseous fluid flows into the condenser 21a wherein it is cooled. Then the working fluid as a gas or liquid flows into the cooler member 25a wherein it is expanded by means of the expansion valve 26a and cools in such a manner that it can be utilized for the air-conditioning or cooling system of a building or for refrigerations or for the like. Finally, the module 16 is recharged again with the working gas and for the next cycle.

It will be understood that the cycles can take place, one during the day and the other during the evening, or, where the modules are placed on different sides of the building then one cycle may take place during the morning and the next cycle during the afternoon and evening. In the latter event, the cycle can be arranged so that the gas flows from hot modules 16 on the eastern aspect of a building or roof to cool modules 16 on the western aspect of the building or roof, then when the latter cooled modules become heated, the flow may be to a storage space, and finally during the evening or night back to the first modules which are on the eastern aspect of the roof of the building.

Alternatively, the heat for module 16 may be supplied via a heat exchanger from the waste heat of a power plant, incinerator or other source of heat pollution rather than from solar heating. It will also be understood by those skilled in the art that the energy of the expanding gas is also capable of utilization for conversion into mechnical or electrical energy by conventional means utilizing reciprocal engines or turbines and electric generators. In such a case, the invention of the cyclic heating and cooling of the module 16 and storage space 16a is obtainable by proper valving of the waste heat from the source to the heat exchangers for the zeolite material.

The approach described above takes advantage of the cyclic character of solar energy during the day-night period to achieve a pumping effect without the use of compressors or other moving parts. It thus has a potential for a long maintenance free life. However, it either has to be designed for the largest possible integrated sun load during a complete day and therefore will be operating below its maximum capacity most of the time or should be augmented by alternative cooling methods during days of maximum heat.

A second approach to the problem of maximum capacity which results in a reduction in both the size and cost of the complete system will now be described. This approach is based on the circumstance that when a thermal gradient is applied across a piece of absorbing material, the consequence is essentially a pumping action. Although this has been known for materials having a diffusion coefficient which is thermally activated, the situation is substantially different in the family of molecular sieve materials.

Molecular sieve zeolites have a crystal structure of intracrystalline pores in the form of large cavities (in the molecular sense) linked by large or small shared windows. For this reason the motion of a gas molecule consists of a thermally activated "sticking" to the inside of the cavities and a second energy barrier for diffusion through the windows between cavities. This second process is responsible for the sifting action of the molecular sieves whereby gases with molecular dimensions less than the window size pass through the sieve whereas gases with molecular sizes larger than the windows do not pass. In addition, molecules with large electric dipole moment usually "stick" to the cavities (water for example) in contrast to atoms and molecules without such moment — for example the noble gases — which do not stick to the cavities and their motion is controlled only by their relative size vis-a-vis the size of the windows. For these reasons, motion of gases through molecular sieves resembles diffusion only slightly and is considerably more complex.

In trials with a zeolite, Linde type 4A, panels were sintered with a Kaolin binder. With one side of such panels being heated to about 100° centigrade, a pumping action was observed with a variety of different working gases. Such gases included $CO_2$, Freon-11 ($CCl_3F$), Freon-12 ($CCL_2F_2$), Freon-21 ($CHCl_2F$), Freon-22 ($CHClF_2$), water vapor, $NH_3$, $SO_2$, and $N_2$ and $O_2$.

In the embodiment of the invention being discussed, the glass covered container 41 is used and the panel 44 is utilized as a divider to separate the container into separated pressure vessels which compares with the first approach wherein the zeolite did not form a pressure barrier and thus the inlet and outlet portions of the container 10 were, in effect, at all times at approximately the same pressure.

Referring now to FIGS. 5-7, it is to be noted that metal container 41 with a transparent cover 42 contains the sintered zeolite divider 44. The side 45 of the zeolite 44 facing the sun is darkened by an appropriate means, for example with carbon black. Container 41 is divided in two halves, a rear one 46 containing a low pressure, low temperature gas and a forward casing 47 which contains the high pressure, high temperature working gas. When heat from the sun or other source heats the side 45 of zeolite 41, it creates a temperature gradient ΔT which is designated by reference numeral 50 in FIG. 6. The inner molecular pumping action of the zeolite barrier 44 described above creates a pressure differential between the rear half 46 of the container 41 and the forward casing 47. This pressure differential is then used to produce the desired energy expenditure of the system.

In a module 51 shown in FIG. 5, the individual panels 41 have their outlets 52 and inlets 54 connected in series as illustrated in the upper part of FIG. 5 in order to obtain higher pressure or in parallel as indicated in the lower portion of FIG. 5, for a greater flow rate, or in a combination thereof.

As shown in FIG. 7, the module 51 has its outlet 52 connected to a first conduit 55 via a one-way valve 56 which leads into a condenser unit 57 which can be cooled by fan 60 or other appropriate cooling means. The outlet of condenser 57 carries the working gas through a conduit 59 into a cooler member 62 via a one-way valve 61. In the cooler member 62, the gas is expanded by means of an expansion valve 64 whereby it becomes very cool and may be utilized for air-conditioning, refrigeration or the like. The resulting fluid is then collected and returned via a return conduit 65 to the low pressure gas inlet 54 of the module 51 via a one-way valve 66 which is contained in the conduit 65.

Thus, as may be seen in the above-described apparatus FIGS. 5–7, the working gas from the high pressure casing 47 is conveyed from the high pressure outlet 52 through a one-way valve 56 and conduit 55 to the condenser unit 57 where the gas is cooled by air from fan 60 or cooling water or other suitable means. The gas now cooled (which may be in a liquid form) is conveyed from condensor 57 into cooler member 62 where it produces cooling or refrigeration by expansion via the expansion valve 64. The resulting low pressure gas is then conveyed through the conduit 65 via the one-way valve 66 back to the low pressure half 46 of container 41 through the low pressure gas inlet 54.

In absolute pressure, the following pressure differentials have been found operable with the gases: Freon-11, 3/18 psi; Freon-12, 26/107 psi; Freon-21, 5/51 psi; Freon-22, 43/175 psi; water vapor, 0.1/1.0 psi; $SO_2$, 12/66 psi; $CO_2$, 332/1043 psi; and $NH_3$, 35/170 psi.

This last-described embodiment has the advantage of being capable of reusing the same volume of gas over and over again during a given day and having a cooling output which is directly proportional to the solar heat load. Thus, the larger the solar heat load, the greater is the cooling action which results.

Both approaches have advantage over the conventional sorption cooling systems in that they have potentially higher efficiencies because of the much stronger temperature dependence of the sorption process. In addition, there is no need for mechanical moving parts inasmuch as the system consists only of solid panels, pressure vessels and conduits, and the working gas — thus, offering high reliability and a long operating life.

Having thus described my invention, what I claim as new and desire to secure by Letters Patent of the United States is:

1. A sorption system for low-grade heat utilization which comprises first and second hermetically sealed containers, a solid absorbent material contained in at least said first container, said first container being located where it is periodically heated by a low-grade heat source relative to said second container whereby the said absorbent material in said first container has a relative temperature higher than said second container for a period of time and during a further period of time the absorbent material in said first container has a lower relative temperature than said second container, a closed circuit between said containers, a gaseous fluid adapted to be absorbed by said absorbent material in said circuit and said first container, said circuit including a first line from said first condenser to a first condenser, a second line from said first condenser to a first gas expansion cooler means, a third line from said gas expansion means to said second container, a fourth line from said second container to a second condenser, a fifth line from said second condenser to a second gas expansion cooler means, and a sixth line from said second gas expansion cooler means to said first container.

2. A sorption system in accordance with claim 1 wherein said first container has an outlet therefrom included in said first line and an inlet thereto included in said sixth line, oneway valves being included in said first and sixth lines.

3. A sorption system in accordance with claim 2, wherein said second container has an inlet thereto included in said third line and an outlet therefrom included in said fourth line, oneway valves being included in said third and fourth lines.

4. A sorption system in accordance with claim 3, wherein a single expansion cooler means is provided in the system which comprises said first gas expansion cooler means when the pressure of said gas at the outlet of said first container is greater than the pressure of said gas at the inlet of said second container and said second gas expansion cooler means when the pressure of said gas is greater at the outlet of said second container than at the inlet of said first container.

5. A sorption system in accordance with claim 3, wherein a single condenser is provided in the system which comprises said first condenser when the pressure of said gas at the outlet of said first container is greater than the pressure of said gas at the inlet of said second container and said second condenser when the pressure of said gas is greater at the outlet of said second container than at the inlet of said first container.

6. A sorption system in accordance with claim 1, wherein said heat source comprises solar energy.

7. A sorption system in accordance with claim 1, wherein said heat source comprises a heated fluid.

8. A sorption system in accordance with claim 7, wherein said heat source comprises a heated gas.

9. A sorption system in accordance with claim 1, wherein said absorbent material is composed of zeolite.

10. An efficient system for a low-grade heat utilization which converts small variations in absolute temperature to relatively larger variations of gas pressure, the system comprising:
  a hermetically sealed container, said container having an inlet and an outlet each with a one-way valve;
  a solid absorbent material composed of molecular sieve zeolite in said container, said absorbent material adapted to absorb an expansible fluid which enters said container through said inlet when relatively cool and to expel said fluid through said outlet when relatively heated;

a low-grade heating means adapted periodically to raise the temperature of said absorbent material;

a source of gaseous fluid adapted to be absorbed by said absorbent material available to said inlet; and heat energy utilization means connected to said outlet.

11. A system for a low-grade heat utilization in accordance with claim 10, wherein said heat energy utilization means comprises a condenser and a gas expansion cooler means for cooling said gas.

* * * * *